A. H. HAPPE & W. J. KEEP.
ELECTRIC COOKING RANGE.
APPLICATION FILED JUNE 30, 1915.

1,176,217.

Patented Mar. 21, 1916.
3 SHEETS—SHEET 1.

Witnesses
Chas. W. Stauffiger
Karl H. Butler

Inventors
Arthur H. Happe,
William J. Keep,
By
Attorneys

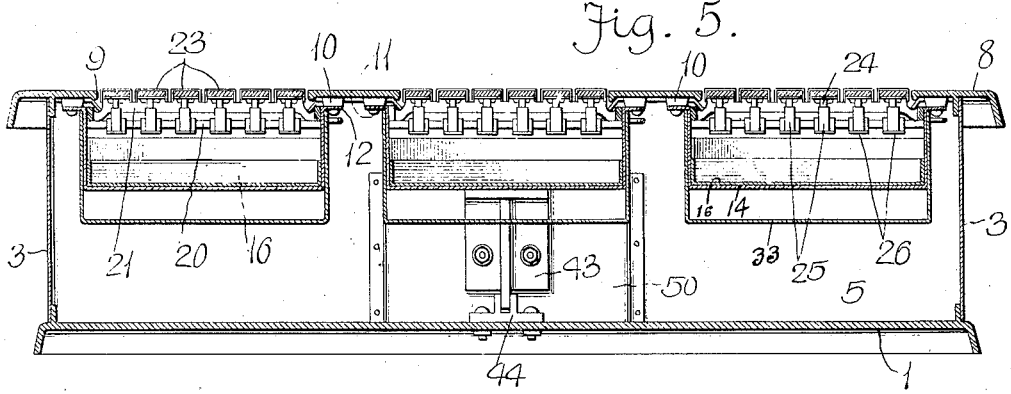
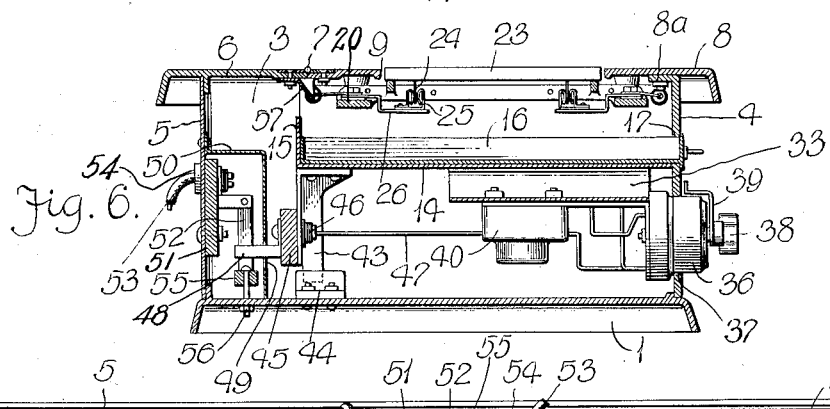
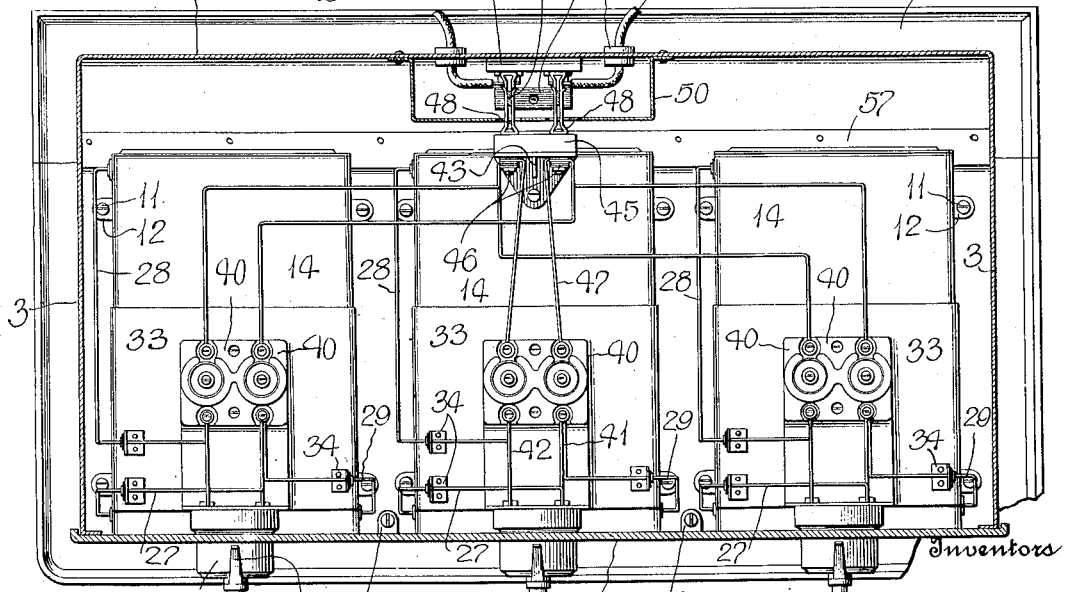

A. H. HAPPE & W. J. KEEP.
ELECTRIC COOKING RANGE.
APPLICATION FILED JUNE 30, 1915.
1,176,217.
Patented Mar. 21, 1916.
3 SHEETS—SHEET 3.
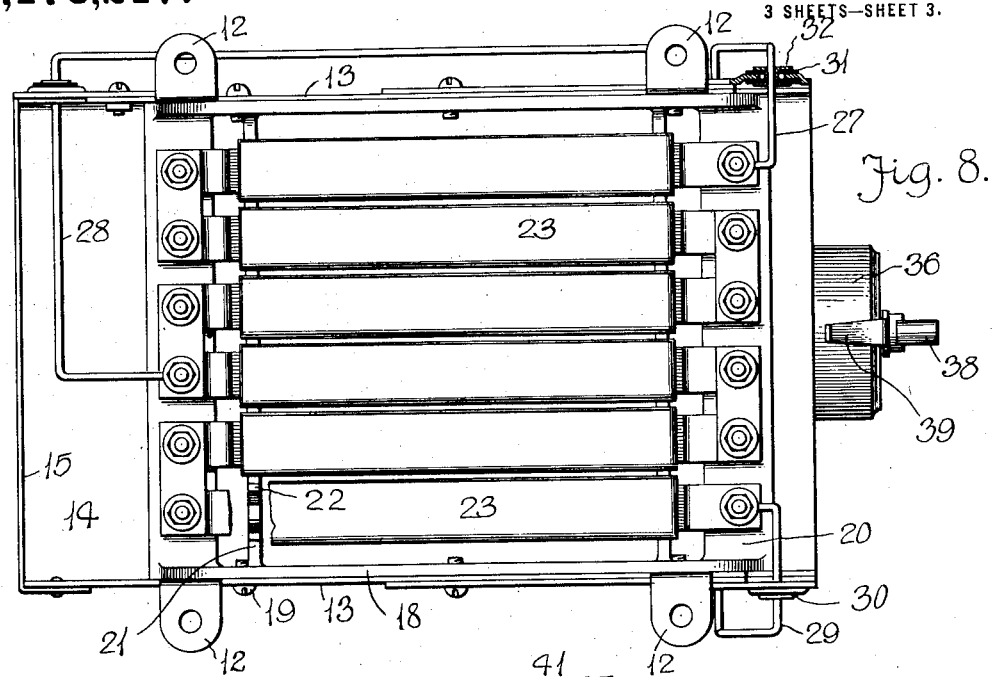
Fig. 8.
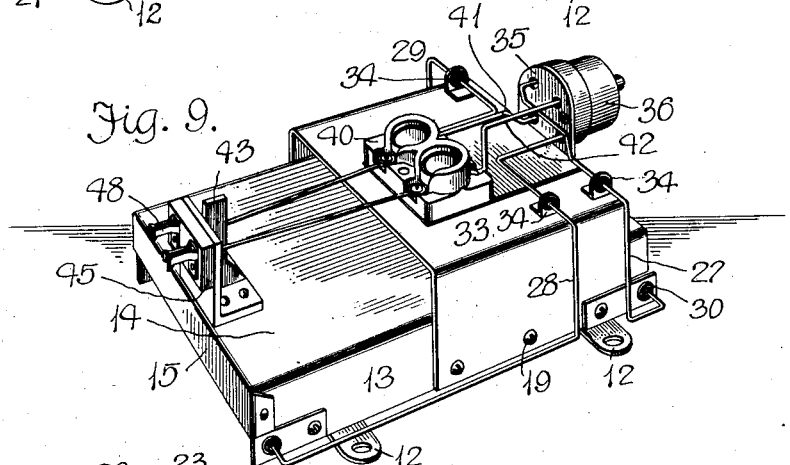
Fig. 9.
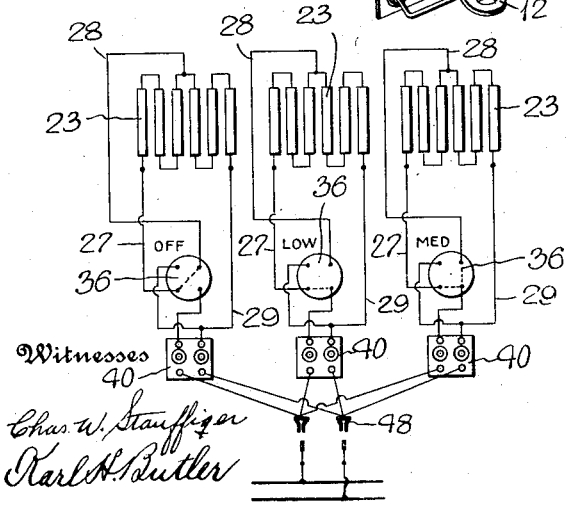
Fig. 10.
Inventors
Arthur H. Happe,
William J. Keep,
Witnesses
Chas. W. Stauffer
Karl H. Butler
By
Attorneys

UNITED STATES PATENT OFFICE.

ARTHUR H. HAPPE AND WILLIAM J. KEEP, OF DETROIT, MICHIGAN, ASSIGNORS TO THE MICHIGAN STOVE COMPANY, OF DETROIT, MICHIGAN, A CORPORATION OF MICHIGAN.

ELECTRIC COOKING-RANGE.

1,176,217.  Specification of Letters Patent.  Patented Mar. 21, 1916.

Application filed June 30, 1915. Serial No. 37,186.

*To all whom it may concern:*

Be it known that we, ARTHUR H. HAPPE and WILLIAM J. KEEP, citizens of the United States of America, residing at Detroit, in the county of Wayne and State of Michigan, have invented certain new and useful Improvements in Electric Cooking-Ranges; of which the following is a specification, reference being had therein to the accompanying drawings.

This invention relates to electric cooking ranges, and the objects of our invention are, first, to provide a comparatively flat and compact cooking range embodying a plurality of grids, each containing novel armored elements; second, to furnish a cooking range with a hinged cooking top that permits of easy access being had to the interior of the structure to remove cooking instrumentalities and install electrical devices; third, to furnish an electric cooking range of the above type with drip pans and deflectors which prevent grease, liquids and boiled over matter from interfering with the electrical connections of the structure; fourth, to provide novel switches for controlling the electrical circuits of the cooking range, each switch having means for predetermining the operation of the same; fifth, to provide a novel oven electrically heated from within itself, and sixth, to provide a durable electric range wherein the parts are constructed with a view of reducing the cost of manufacture and at the same time retain the features by which safety, inexpensive maintenance, and ease of assembling are secured.

With such ends in view, our invention resides in the novel construction, combination and arrangement of parts to be hereinafter specifically described and then claimed, and reference will now be had to the drawings, wherein—

Figure 1:
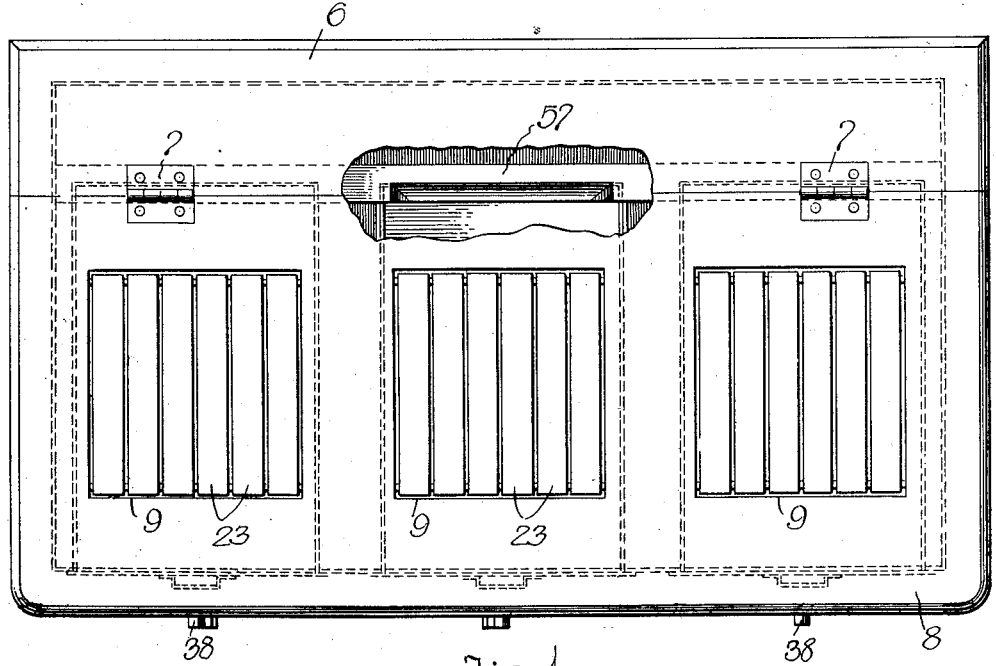
Figure 2:
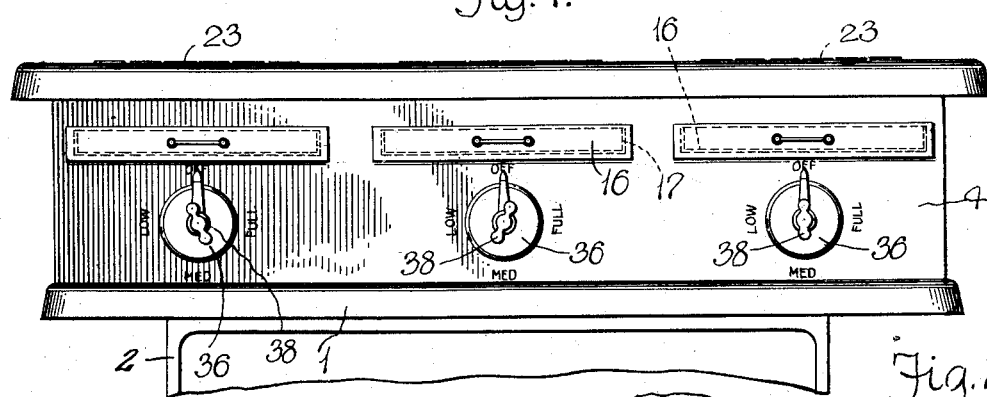
Figure 3:
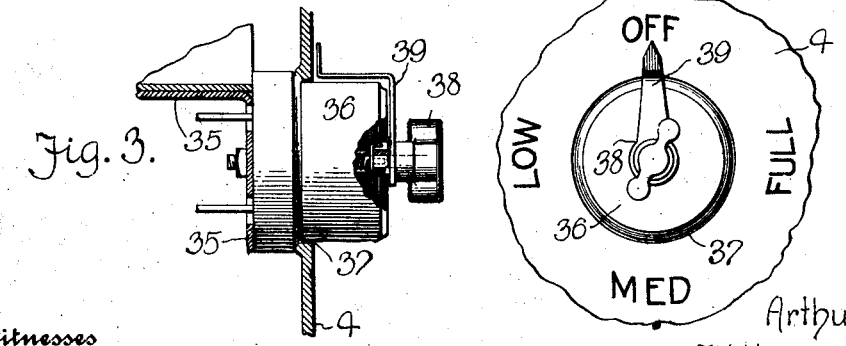
Figure 4:
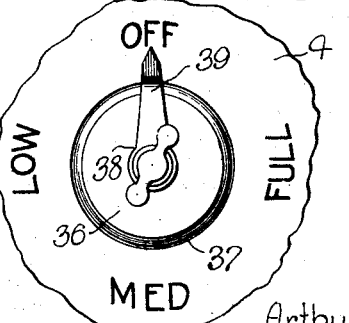

Figure 1 is a plan of the boiling top of an electric cooking range, partly broken away illustrating a deflector; Fig. 2 is a front elevation of the boiling top of the electric cooking range; Fig. 3 is an enlarged side elevation of the switch partly broken away and partly in section; Fig. 4 is a front elevation of the same; Fig. 5 is a longitudinal sectional view of the range boiling top; Fig. 6 is a cross sectional view of the same; Fig. 7 is a horizontal sectional view of the range boiling top looking upwardly at the bottom of the grid housing; Fig. 8 is an enlarged plan of a grid housing; Fig. 9 is a perspective view of the same inverted; and Fig. 10 is a diagrammatic view illustrating the electrical connections of the range boiling top.

In the drawings, the reference numeral 1 denotes a case rectangular in plan, and this case is supported on an oven 2, as shown in Fig. 2. The case has end walls 3, a front wall or dial plate 4 and a rear wall 5. The end walls 3 and the rear wall 5 can be made of sheet metal and the front wall 4 may be made of cast metal on account of supporting devices that are essential in the stove structure.

On the upper edges of the walls 3 and 5 is a rear top plate 6 and hinged or otherwise connected to the front edge of said top plate, as at 7, is a grid plate 8, which coöperates with the rear top plate 6 in forming the cooking or boiling top of the range. By hinging or otherwise connecting the grid plate 8 to the rear top plate 6, and by connecting the front wall 4 to said grid plate, as at 8$^a$, said grid plate and the front wall constitute a range front portion that can be raised to permit of easy access being had to devices within the stove and grid housings carried by the under side of said grid plate. The grid plate 8 has a plurality of rectangular openings 9 and at the sides of said openings are depending bosses 10 to which are connected by screws 11 or similar fastening means the apertured lugs 12 of grid housings. Each grid housing comprises side walls 13, a bottom plate 14 and a rear wall 15, all preferably made of sheet metal forming a guideway for a drip pan 16 extending through an opening 17 provided therefor in the front wall 4 of the cooking range.

Mounted in each grid housing is a grid frame, comprising bridge pieces 18 connected to the inner sides of the walls 13 by screws 19 or other fastening means. The ends of the bridge pieces 18 are connected by apertured cross bars 20 and 21. The upper edges of the supports 21 are provided with sets of spacing lugs 22 adapted to extend into armored elements 23 placed upon the supports. The armored elements 23 have depending contact blades 24 adjacent the ends thereof, as shown in Fig. 6, and these armored elements, together with the grid frame, form the subject matter of another application filed June 17th, 1915, Serial No. 34565. As shown in Fig. 6, the armored elements of each grid are in a plane slightly above the grid plate 8 and the blades 24 of said armored elements extend into spring clip connectors 25, swiveled on inwardly projecting brackets 26, carried by the flat apertured bars 20 of the grid frame.

The armored elements 25 are in series, as shown in Fig. 8 and bared lead wires 27, 28 and 29 extend through insulated supports 30 carried by the side walls 13 of the grid housing. The insulated supports 30 are detachable relative to the grid housing whereby said supports can be threaded on the lead wires and then connected to the grid housing. Each support includes washers of insulation 31 and an eyelet 32 through which extends a lead wire. The lead wires 27, 28 and 29 extend downwardly and along the sides of a heat shield and support 33, channel shaped in cross section, with the side walls thereof connected to the walls 13 of the grid housing. The heat shield 33 is in spaced relation to the bottom plate 14 of the grid housing and prevents certain electrical devices carried by the heat shield from being injured or distorted by heat from the armored elements 23 of the grid. The bottom of the heat shield 33 is provided with supports 34 for the lead wires 27, 28 and 29 and centrally of said heat shield is an angle bracket 35. Suitably connected to the forward end of the angle bracket 35 is a switch 36 extending through an opening 37 provided therefor in the front wall 4 of the case. The switch may extend through the wall any distance and said wall need not rest upon the porcelain base of the switch, as shown in Fig. 3. The switch 36 has an operating button 38 and an indicating pointer 39, said indicating pointer being shaped to overlie the switch 36 and extend in front of the wall 4 to coöperate with such designation, as "off" "low" "medium" and "high" in predetermining an operation of the switch. With the pointers removed, the switches slide in and out the openings of the wall 4, thus facilitating the assembling of grid housings below the boiling top. The connection between the indicating pointer 39 and the operating button 38 is such that the indicating pointer is moved in advance of a snap operation of the switch, and the advantages of this construction have been set forth in the pending application of William J. Keep, filed December 26, 1914, Serial No. 879,216 for certain improvements in an electric cooking range.

The lead wires 27 and 28 are connected to the switch 36 and the lead wire 29 is connected to a fuse block 40 on the rear end of the angle bracket 35. The fuse block 40 is of the conventional form and is connected by wires 41 and 42 to the switch 36.

The rear or inner end of the centralmost grid housing may be provided with a depending leg or support 43 adapted to extend into a positioning socket 44, carried by the bottom of the cooking range. The leg or support 43 has a block 45 of insulation for binding posts 46 to which are connected wires 47 extending to the fuse block 40 of the grid housings, as best shown in Fig. 7. In some instances, the leg 43 may be dispensed with and simply a support maintained for the binding posts 46. The binding posts 46 retain spring clips 48 on the block 45 and these spring clips are adapted to extend through openings 49 provided therefor in the wall of a switch casing 50 connected to the rear wall 5 of the main case 1. The rear wall 5, within the casing 50, has a support 51 of insulation for blades 52 adapted to be engaged by the spring clips 48. There may be a reverse arrangement of the clips and blades if necessary. Connected to the blades 52 are lead-in wires 53 from a suitable source of electrical energy, said lead-in wires passing through washers 54 of insulation carried by the wall 5. The blades 52 are braced by a block of insulation connected to the bottom of the case 1, as at 56, whereby the blades 52 cannot become accidentally displaced and will always be in position to engage the spring clips 48 as said clips are swung through the openings 49 of the casing 50. These switch parts may be duplicated for each of the grid housings so that each of the housings may be exactly alike.

The front edge of the rear top plate 6, at each of the openings 9, is provided with an angularly disposed deflector 57, as best shown in Figs. 1 and 6, and any matter that passes through the rear ends of the openings 9 is deflected into the drip pans 16 and prevented from interfering with electrical connections particularly at the centralmost grid housing.

Considerable importance is attached to the application of the various devices just described. With the grid plate 8 hinged to the top plate 6, the grid plate can be elevated insomuch that the blades 52 and the spring clips 48 constitute a main line knife switch which permits of the electrical connection being automatically broken as the range front portion or grid plate is raised. With the grid housing detachably connected to the underside of the grid plate 8, either of the housings can be removed by disconnecting the wires 47 leading to the fuse block 40 of the housing, or the housings can all be made with independent lead-in switches. The housings are fabricated independently on a bench and in assembling the range, are handled as a single unit.

What we claim is:—

1. In an electric cooking range, a hinged top having openings adapted for boiling grids and having a front portion, indicating switches in the front portion of said hinged top, a make and break device having a portion carried by said hinged top and a portion carried by said range, and electric connections for that part of said make and break device carried by said range.

2. In an electric cooking range, a case having a front wall, a grid housing adapted to contain a boiling grid, a removable pan in said housing, a cut-out fuse block supported from said housing, means in said case adapted to establish electrical connections with said fuse block, and a switch extending through the front wall of said case connected to said fuse block and adapted to coöperate with the front wall of said case in predetermining the operative conditions of the range.

3. In an electric cooking range, a movable housing, an electrically heated grid carried thereby, removable means in said housing adapted to catch spilled or boiled over matter cooked on said grid, electrical devices adapted to control the operation of said grid, and a support for said devices serving as a shield between said devices and said housing.

4. In an electric cooking range, a movable housing, an electrically heated grid carried thereby, removable means in said housing adapted to catch spilled or boiled over matter cooked on said grid, a support below said housing, and a switch carried by said support adapted to predetermine operative conditions of said grid.

5. In an electric cooking range, a movable housing, an electrically heated grid carried thereby, removable means in said housing adapted to catch spilled or boiled over matter cooked on said grid, a support below said housing, a fuse block carried by said support, and a switch carried by said support and connected to said fuse block and adapted to predetermine the operation of said grid.

6. In an electric cooking range, a hinged boiling top, grid housings assembled as portable units and attached to the bottom of said boiling top, and heating elements forming part of said grid housings.

7. In an electric range, a grid, a fuse block therefor, a make and break switch in circuit with said fuse block and said grid, lead-in wires for said switch, and movable means inclosing said fuse block and adapted to actuate said switch to break the circuit thereof before access can be had to said fuse block.

8. In an electric cooking range, an electrically heated boiling grid, in the top of said range, a housing beneath said grid, and a cut-out fuse block attached to the bottom of said housing with an intervening insulating air space between said fuse block and said grid.

9. In an electric cooking range, a top having openings, a front wall forming part of said top and provided with openings, housings, grids carried thereby and adapted for extending into the openings of said top, and switches carried by said housings and adapted for extending into the openings in the front wall of said top, the housings being assembled as units relative to said top.

10. In an electric range, a grid, a fuse block, bared wires connecting said fuse block and grid, a make and break switch, bared wires connecting said switch and fuse block, insulating supports for said bared wires, lead-in wires for said switch, and means adapted to actuate said switch to break the circuit of said fuse block and grid before access can be had to said fuse block.

11. In an electric cooking range, a hinged top, coöperating grids carried thereby, fuse blocks and switches, and a housing connecting said fuse blocks, and switches to said hinged top.

12. In an electric cooking range, a hinged top, cooking grids carried thereby, and a make and break switch adapted for the operating circuit of said grids and having a portion thereof carried by said hinged top whereby the operating circuit of said grids is automatically controlled by a movement of the hinged top relative to said make and break switch.

13. In an electric cooking range, a case, a hinged top, cooking grids and indicating switches carried by said hinged top, an electric circuit for said grids and switches, and a make and break main line switch adapted to control the electric circuit of said cooking grids and indicating switches and having separable parts carried by said case and said hinged top and adapted to automatically break and make the circuit of said cooking grids and said indicating switches.

14. In an electric cooking range, a hinged top, boiling grids attached thereto, and a main line knife switch for said boiling grids opened by raising said hinged top.

15. In an electric cooking range, a main line knife switch, a guard casing therefor provided with an opening, and a movable cooking device having a blade adapted to enter the opening of said guard casing and enter said switch.

16. In an electric cooking range, a main line switch, a guard casing therefor provided with an opening, cooking devices assembled as a unit movable relative to said casing and having a blade common to all said devices adapted to enter the opening of said casing and establish a main circuit for said devices.

17. In an electric cooking range, a main line switch, a guard casing therefor provided with an opening, cooking devices assembled as a unit movable relative to said casing and having a blade common to all of said devices adapted to enter the opening of said casing and establish a main circuit for said devices, and indicating switches for said devices adapted to control each device independent of said main line switch.

18. In an electric cooking range, a hinged range front having the top portion provided with openings, a grid housing in the range front and movable therewith, electrical devices carried thereby, one of said devices extending through an opening in the top portion of the range front, and another of said devices controlling and predetermining the operative conditions of the last mentioned electrical device.

In testimony whereof we affix our signatures in presence of two witnesses.

ARTHUR H. HAPPE.
WILLIAM J. KEEP.

Witnesses:
  JNO. P. CRUDDER,
  ALFRED J. MURPHY.